March 3, 1931.  A. C. ENGELHART  1,795,253
LIQUID HEATER
Filed Jan. 22, 1929  2 Sheets-Sheet 1
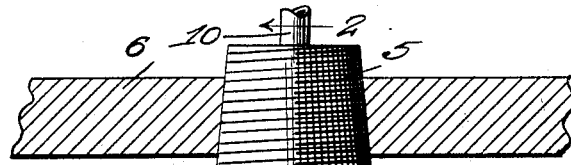
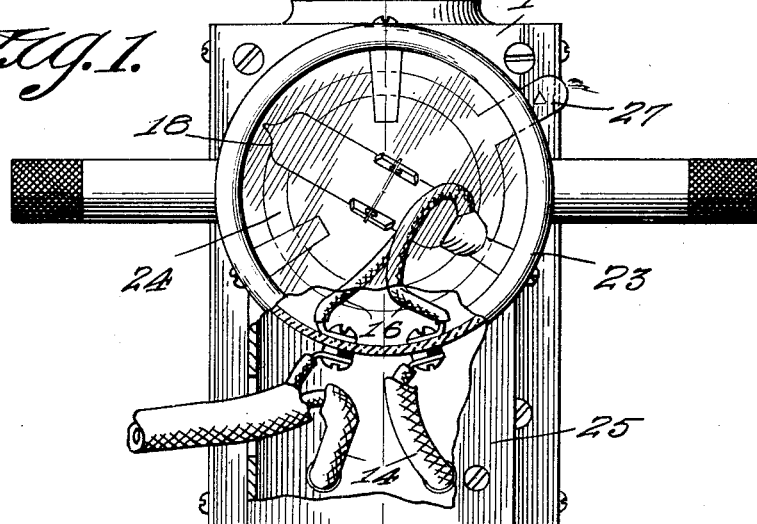
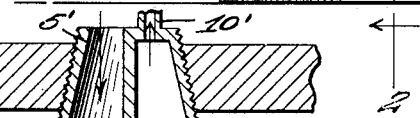
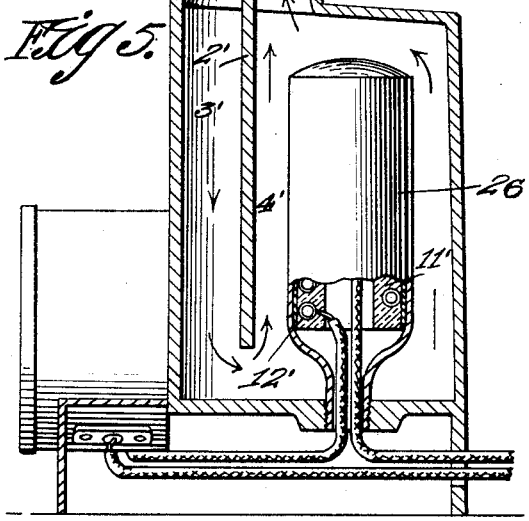
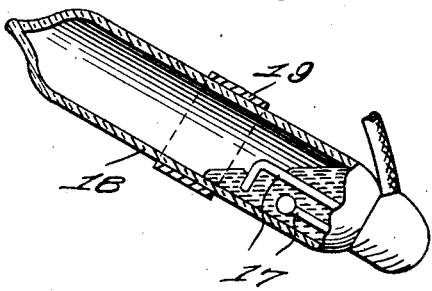
Alexis C. Engelhart,
INVENTOR
BY Victor J. Evans
ATTORNEY March 3, 1931. A. C. ENGELHART 1,795,253
LIQUID HEATER
Filed Jan. 22, 1929 2 Sheets-Sheet 2
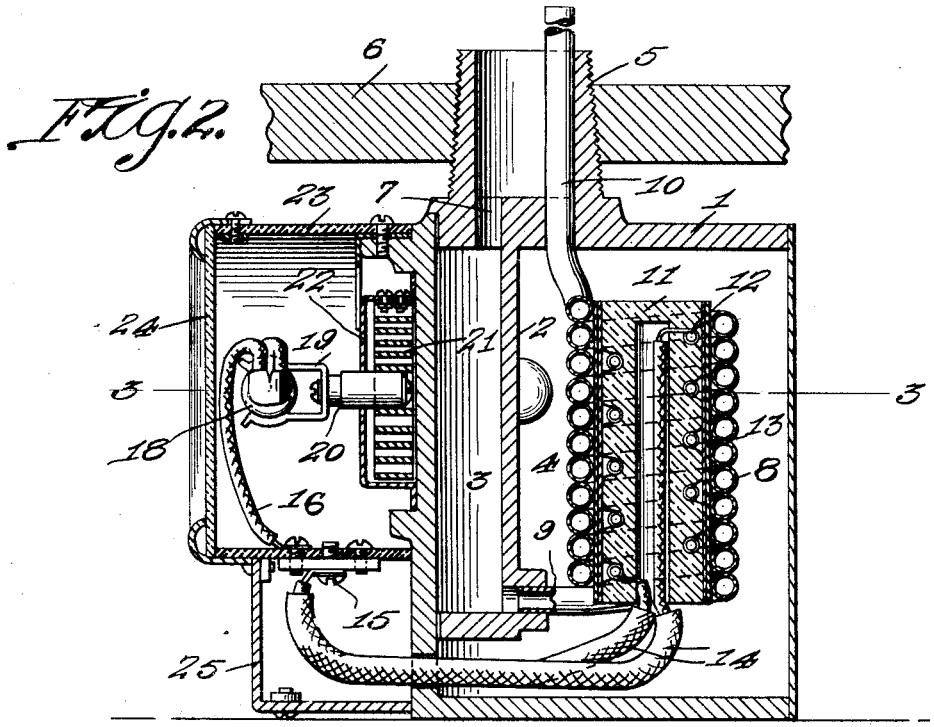
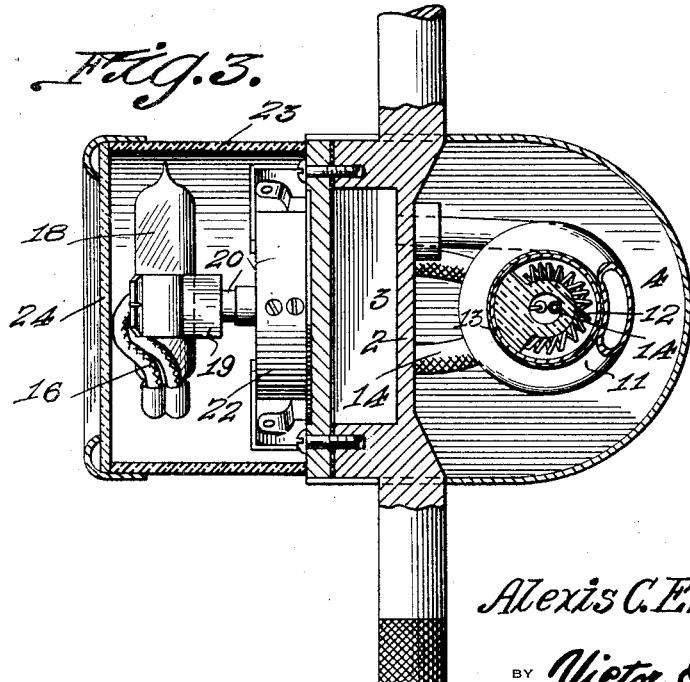
Alexis C. Engelhart,
INVENTOR
BY Victor J. Evans
ATTORNEY Patented Mar. 3, 1931

1,795,253

UNITED STATES PATENT OFFICE

ALEXIS C. ENGELHART, OF MEMPHIS, TENNESSEE

LIQUID HEATER

Application filed January 22, 1929. Serial No. 334,257.

This invention relates to a device for heating liquids, the general object of the invention being to provide a casing having electrical heating means therein, with means whereby the casing can be placed in communication with the lower part of a container for the liquid, with means whereby the heating of the liquid in the casing will cause the liquid to circulate in the container through the casing back into the container, so that the liquid in the container will be heated.

Another object of the invention is to provide an automatic switch for controlling the circuit of the electrical heating means to prevent the liquid being heated to too high a degree.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a front view, partly broken away, showing the heater connected with a container.

Figure 2 is a section on line 2—2 of Figure 1.

Figure 3 is a section on line 3—3 of Figure 2.

Figure 4 is a view partly in section of the mercury switch.

Figure 5 is a sectional view, showing a modification.

In these views, the numeral 1 indicates a casing which is divided by the partition 2 into a small chamber 3 and a large chamber 4. A tapered and screw threaded nipple 5 is formed on the top of the casing and is adapted to be placed in a hole in the bottom of a container, part of which is shown at 6. An opening 7 in the top wall of the casing places the nipple in communication with the chamber 3 so that liquid in the container will pass through said opening into said chamber. A coil 8 is placed in the chamber 4 and has its lower end 9 connected with the top part of the chamber 3 and its upper end is formed with an extension 10 which extends through the nipple into the container.

A carrier 11, formed of non-conducting material, supports the electrical heating coil 12, these coils being insulated from the coils 8 by the non-conducting material 13 and the conductors 14 connect the ends of the coil 12 with the terminals 15 which are in turn connected by the conductors 16 with the terminals 17 in a mercury tube 18. This tube is connected by a yoke 19 with a stem 20 which is connected to the inner end of a thermostatic coil 21 placed in a casing 22, the outer end of the coil or strip 21 being connected with said casing. This casing is rotatably supported against a wall of the casing 1, this wall forming part of the chamber 3 so that the heat from the liquid passing through the chamber 3 will act on the thermostatic device and when this heat reaches a certain degree, the strip 21 will so act upon the stem 20 as to cause the same to turn and thus tilt the tube and cause the mercury therein to leave the terminals 17 and thus break the circuit to the heating coil. When the liquid cools, the thermostatic device will tilt the tube in an opposite direction, thus causing the mercury to again bridge the terminals 17 and again close the circuit to the heating coil so that the heating action will start up again.

The heating of the liquid in the coil 18 will cause the liquid to pass upwardly through the extension 10 into the upper part of the container and other liquid will flow from the container through the port 7 into the chamber 3 and then into the coil, so that the liquid in the container will circulate through the heating device and thus the liquid in the container will be heated.

A casing 23, having a transparent front 24, encloses the thermostatic device and the switch, and a small casing 25 encloses portions of the conductors 14 and the terminals 15.

In the modification shown in Figure 5, the electrical coil 12' and its carrier 11' are enclosed in a casing 26 placed in the chamber 4' so that the liquid coil 8 is omitted as the liquid passes directly from the chamber 3' into the chamber 4', where it is heated by the electrical means in the casing 26. In this modification, the partition 2" extends into the nipple 5' and divides the same into an inlet and outlet portion, a tube 10' connecting the outlet portion with the upper part of the container. In other respects, this form of the invention is similar to that first described.

A handle 27 is attached to the casing 22 and passes through a slot in the casing 23 so that by moving this handle, the casing 22 and the thermostatic member 21 can be adjusted to move the mercury switch to open and closed position.

From the foregoing it will be seen that I have provided a simple form of heater for heating the contents of the container, with means whereby the heater can be easily and quickly attached to the container.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A heater for heating liquid in a container comprising a casing having a nipple thereon adapted to be placed in a hole in the container, a partition dividing the casing into two chambers, means for placing the first chamber in communication with the container, means for connecting the second chamber with the upper part of the container, means for causing the liquid to pass from the first chamber through the second chamber into said connection, a heating coil in the second chamber for heating the liquid therein, a circuit for the coil, a mercury switch in the said circuit, a casing rotatably connected with one wall of the first casing, a thermostatic device connected with said second casing and with the switch whereby the switch will be controlled by the heat imparted to the liquid passing through the casing.

2. A heater for heating liquid in a container, comprising a casing having a nipple thereon adapted to be placed in a hole in the container, a partition dividing the casing into two chambers, means for placing the first chamber in communication with the container, means for connecting the second chamber with the upper part of the container, means for causing the liquid to pass from the first chamber through the second chamber into said connection, a heating coil in the second chamber for heating the liquid therein, a circuit for the coil, a mercury switch in the said circuit, a casing rotatably connected with one wall of the first casing, a thermostatic device connected with said second casing and with the switch whereby the switch will be controlled by the heat imparted to the liquid passing through the casing and manually operated means for adjusting the second casing to open and close the switch.

3. A heater for heating liquid in a container, comprising a casing having a nipple thereon adapted to be placed in a hole in the container, a partition dividing the casing into two chambers, means for placing the first chamber in communication with the container, means for connecting the second chamber with the upper part of the container, means for causing the liquid to pass from the first chamber through the second chamber into said connection, a heating coil in the second chamber for heating the liquid therein, a circuit for the coil, a mercury switch in the said circuit, a casing rotatably connected with one wall of the first casing, a thermostatic device connected with said second casing and with the switch whereby the switch will be controlled by the heat imparted to the liquid passing through the casing, manually operated means for adjusting the second casing to open and close the switch and a housing having a transparent front for enclosing the second casing and the switch.

4. A heater for heating liquid in a container, comprising a casing, a partition therein dividing the same into two chambers, means for connecting one chamber with the interior of the container, a coil in the other chamber and connected with the first chamber whereby the liquid in the first chamber will pass through the coil, a pipe for leading the liquid from the coil back into the container and an electric heating medium in the second chamber and around which the coil is wound.

In testimony whereof I affix my signature.

ALEXIS C. ENGELHART.